United States Patent
Aiso et al.

(10) Patent No.: US 11,110,602 B2
(45) Date of Patent: Sep. 7, 2021

(54) ROBOT CONTROL DEVICE AND ROBOT SYSTEM

(71) Applicant: Seiko Epson Corporation, Tokyo (JP)

(72) Inventors: Seiji Aiso, Shiojiri (JP); Yukihiro Yamaguchi, Matsumoto (JP)

(73) Assignee: Seiko Epson Corporation

( * ) Notice: Subject to any disclaimer, the term of this patent is extended or adjusted under 35 U.S.C. 154(b) by 393 days.

(21) Appl. No.: 16/180,166

(22) Filed: Nov. 5, 2018

(65) Prior Publication Data

US 2019/0134813 A1    May 9, 2019

(30) Foreign Application Priority Data

Nov. 6, 2017   (JP) .............................. JP2017-213524

(51) Int. Cl.
   *B25J 9/16*   (2006.01)

(52) U.S. Cl.
   CPC .......... *B25J 9/1664* (2013.01); *B25J 9/1697* (2013.01); *G05B 2219/40564* (2013.01); *G05B 2219/45235* (2013.01)

(58) Field of Classification Search
   CPC ................. B25J 9/1664; B25J 9/1697; G05B 2219/40564; G05B 2219/45235
   See application file for complete search history.

(56) References Cited

U.S. PATENT DOCUMENTS

| | | | |
|---|---|---|---|
| 10,768,708 B1* | 9/2020 | Sills | A61B 34/30 |
| 2010/0061623 A1* | 3/2010 | Yokoi | G01B 11/2513 |
| | | | 382/154 |
| 2011/0182489 A1* | 7/2011 | Chang | A61B 8/08 |
| | | | 382/128 |
| 2015/0005923 A1 | 1/2015 | Gu | |
| 2015/0199588 A1* | 7/2015 | Kim | G06T 7/593 |
| | | | 382/154 |
| 2016/0086343 A1* | 3/2016 | Namiki | G06T 7/001 |
| | | | 348/135 |
| 2019/0126487 A1* | 5/2019 | Benaim | B25J 9/1697 |

FOREIGN PATENT DOCUMENTS

| | | | |
|---|---|---|---|
| JP | 2015-134407 A | | 7/2015 |
| KR | 20080088165 A | * | 10/2008 |

OTHER PUBLICATIONS

Christophe Collewet et al "A contour approach for image based control on objects with complex shape", 6 pages (Year: 2000).*

* cited by examiner

*Primary Examiner* — Kira Nguyen (74) *Attorney, Agent, or Firm* — Harness, Dickey & Pierce, P.L.C.

(57) ABSTRACT

A robot control device that controls a robot and includes a processor which extracts a contour of a target based on an image of the target captured by an imaging device, generates a point sequence corresponding to the contour, and converts coordinates of the point sequence into coordinates in a robot coordinate system. Further, a robot control device that controls a robot includes a processor which extracts a contour of a target based on an image of the target captured by an imaging device and a predetermined instruction, generates a point sequence corresponding to the contour, and converts coordinates of the point sequence into coordinates in a robot coordinate system.

5 Claims, 9 Drawing Sheets

ROBOT CONTROL DEVICE AND ROBOT SYSTEM

BACKGROUND

1. Technical Field

The present invention relates to a robot control device, a robot, and a robot system.

2. Related Art

A robot including a base and a robot arm including a plurality of arms (links) is known. One arm of two adjacent arms of the robot arm is rotatably connected to the other arm via a joint portion, and the arm on the most base end side (most upstream side) is rotatably connected to the base via a joint portion. The joint portion is driven by a motor, and the arm is rotated by driving the joint portion. For example, a hand as an end effector is detachably attached to the arm on the most tip end side (most downstream side). Then, for example, the robot grips a target with the hand, moves the target to a predetermined place, and performs predetermined work such as assembly. The operation (driving) of such a robot is controlled by a robot control device.

In JP-A-2015-134407, a deburring device including a deburring tool for removing a burr of a target, a robot for moving the deburring tool, a visual sensor, and a force sensor is disclosed. In the deburring device described in JP-A-2015-134407, shape data of a part from which the burr of the target is removed and information on an orientation of the deburring tool are previously acquired based on three-dimensional data of the target, and an operation program of a robot is created based on the shape data and the information on the orientation of the deburring tool.

An operation program of a robot is usually created by a worker. That is, since a fixed operation program cannot deal with a real complicated environment, in JP-A-2015-134407, a user executes a complicated processing flow and creates an operation program by applying various constraints and contrivances thereto. However, it is difficult for a user to execute the complicated processing flow and create the operation program. Also, providing the fixed operation program to the user hinders versatility, which is an advantage of the robot.

SUMMARY

An advantage of some aspects of the invention is to solve at least a part of the problems described above, and the invention can be implemented as the following forms or application examples.

A robot control device according to an aspect of the invention controls a robot and includes a control unit which extracts a contour of a target based on an image of the target captured by an imaging device, generates a point sequence corresponding to the contour, and converts coordinates of the point sequence into coordinates in a coordinate system which is set in the robot.

According to the robot control device, since the coordinates of the point sequence corresponding to the contour of the target are converted into the coordinates in the coordinate system which is set in the robot, it is possible to easily create an operation program of a robot for the robot to perform work on a contour part of the target.

A robot control device according to another aspect of the invention controls a robot includes a control unit which extracts a contour of a target based on an image of the target captured by an imaging device and a predetermined instruction, generates a point sequence corresponding to the contour, and converts coordinates of the point sequence into coordinates in a coordinate system which is set in the robot.

According to the robot control device, since the coordinates of the point sequence corresponding to the contour of the target are converted into the coordinates in the coordinate system which is set in the robot, it is possible to easily create an operation program of a robot for the robot to perform work on a contour part of the target.

In the robot control device according to the aspect of the invention, it is preferable that the point sequence is disposed shifting toward the centroid the contour rather than the contour.

With this configuration, it is possible to perform work on the part on the centroid side of the contour rather than the contour of the target.

In the robot control device according to the aspect of the invention, it is preferable that the point sequence is disposed shifting away from the centroid of the contour rather than the contour.

With this configuration, it is possible to perform work on a portion on the part on the opposite side to the centroid of the contour rather than the contour of the target.

In the robot control device according to the aspect of the invention, it is preferable that the control unit extracts the contour as a point cloud when extracting the contour.

With this configuration, it is possible to easily generate a point sequence corresponding to the contour of the target.

In the robot control device according to the aspect of the invention, it is preferable that the control unit extracts a portion of the contour when extracting the contour.

With this configuration, it is possible to perform work on a portion of the contour part of the target.

A robot according to still another aspect of the invention includes a robot arm and is controlled by the robot control device according to the aspect of the invention.

According to the robot, it is possible to perform an appropriate operation under the control of the robot control device.

A robot system according to still another aspect of the invention includes a robot and the robot control device according to the aspect of the invention for controlling the robot.

According to the robot system, since the coordinates of the point sequence corresponding to the contour of the target are converted into the coordinates in the coordinate system which is set in the robot, it is possible to easily create an operation program of a robot for the robot to perform work on a contour part of the target.

A robot control device according to still another aspect of the invention controls a robot and includes a processor, in which the processor extracts a contour of a target based on an image of the target captured by an imaging device, generates a point sequence corresponding to the contour, and converts coordinates of the point sequence into coordinates in a coordinate system which is set in the robot.

According to the robot control device, since the coordinates of the point sequence corresponding to the contour of the target are converted into the coordinates in the coordinate system which is set in the robot, it is possible to easily create an operation program of a robot for the robot to perform work on a contour part of the target.

A robot control device according to still another aspect of the invention controls a robot and includes a processor, in which the processor extracts a contour of a target based on an image of the target captured by an imaging device and a predetermined instruction, generates a point sequence corresponding to the contour, and converts coordinates of the point sequence into coordinates in a coordinate system which is set in the robot.

According to the robot control device, since the coordinates of the point sequence corresponding to the contour of the target are converted into the coordinates in the coordinate system which is set in the robot, it is possible to easily create an operation program of a robot for the robot to perform work on a contour part of the target.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot control device, a robot, and a robot system according to the invention will be described in detail based on embodiments illustrated in the accompanying drawings.

First Embodiment

Robot System

Figure 1:
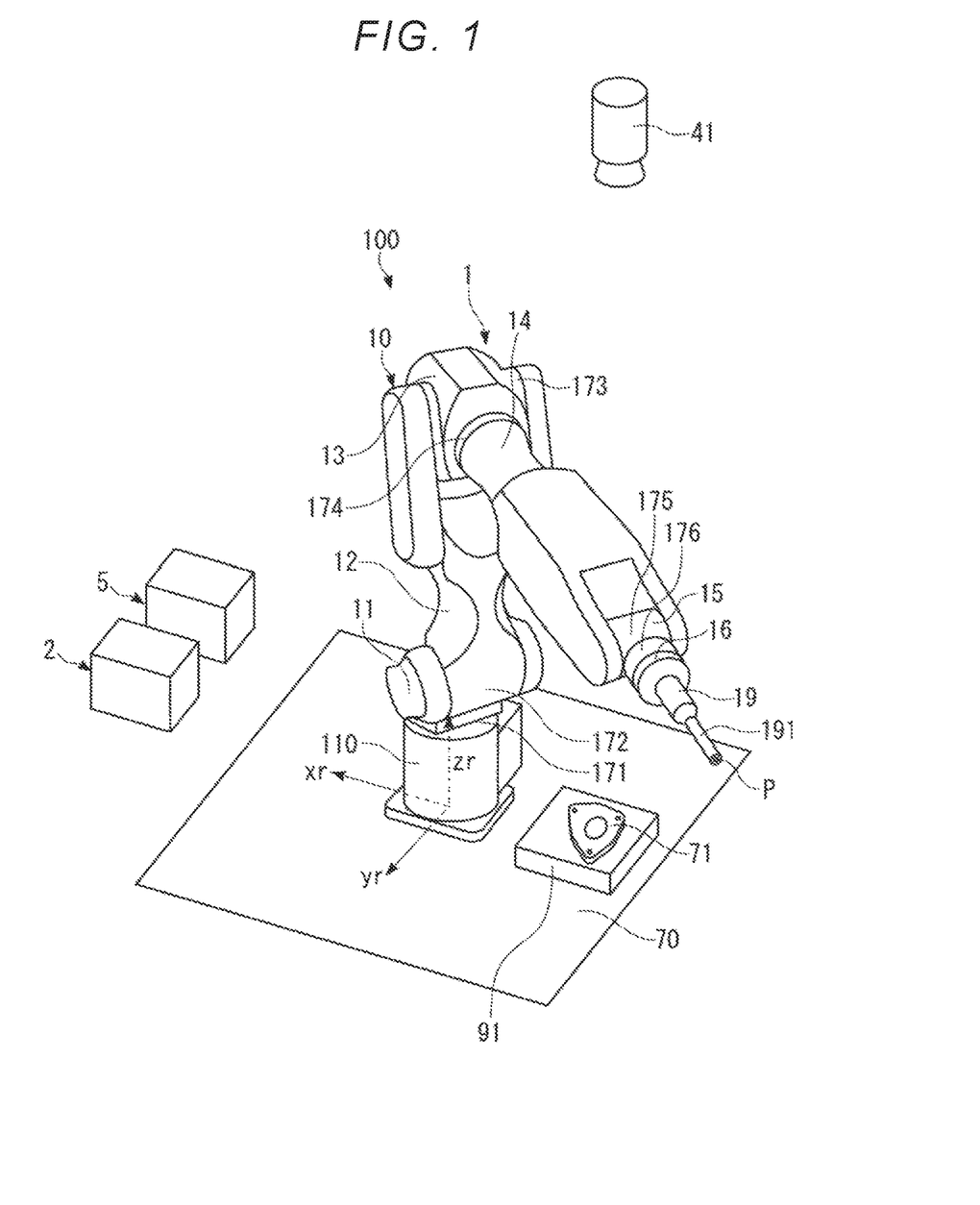
FIG. 1 is a diagram illustrating a robot system according to a first embodiment.
Figure 2:
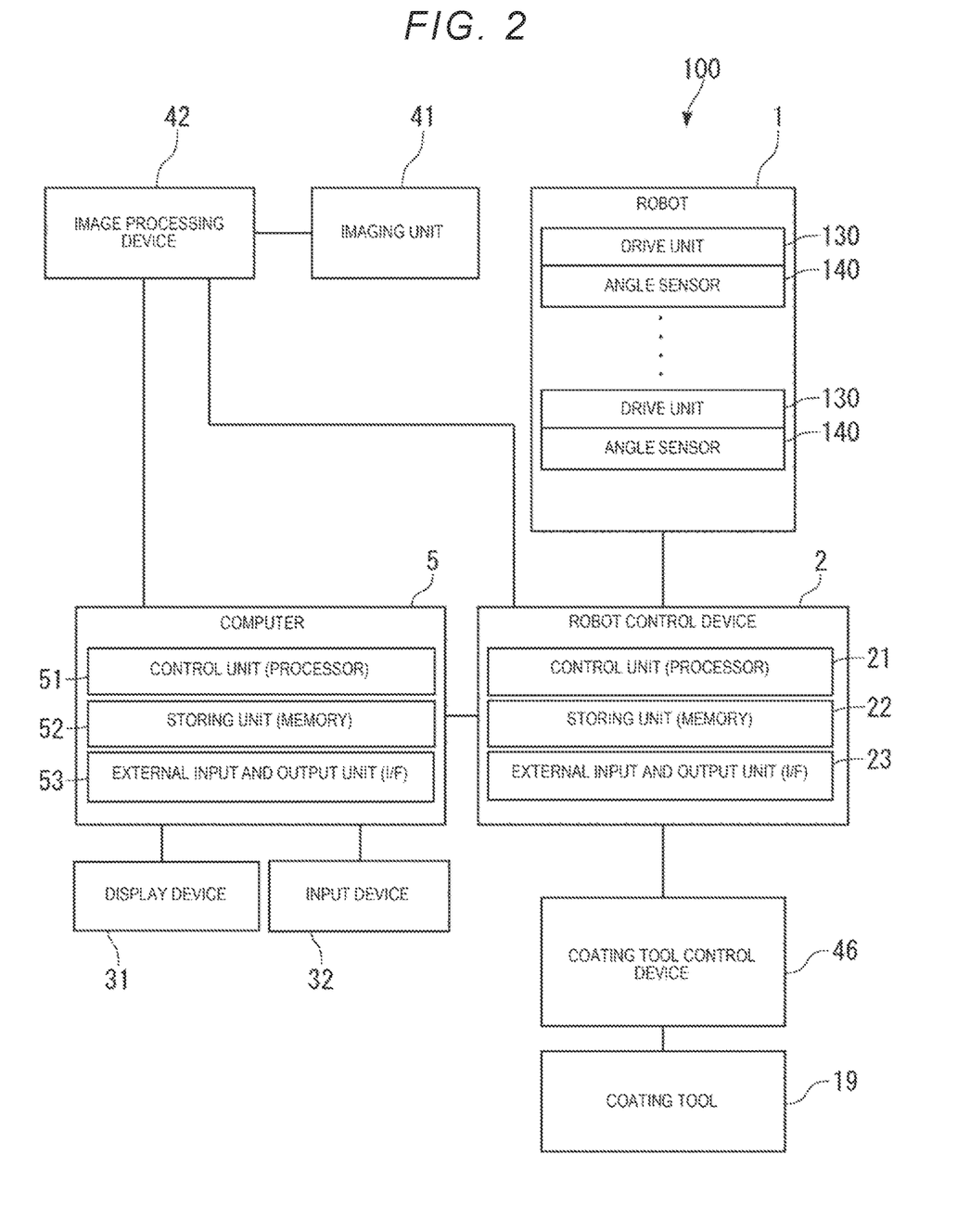
FIG. 2 is a block diagram of the robot system illustrated in FIG. 1.
Figure 9:
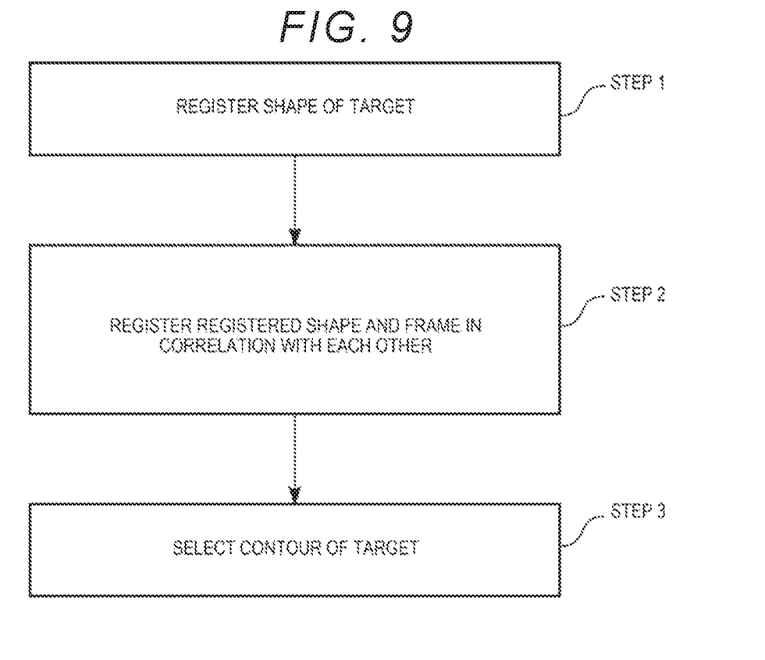
FIG. 9 is a diagram (flowchart) for explaining a procedure of work to be performed by a worker.
Figure 10:
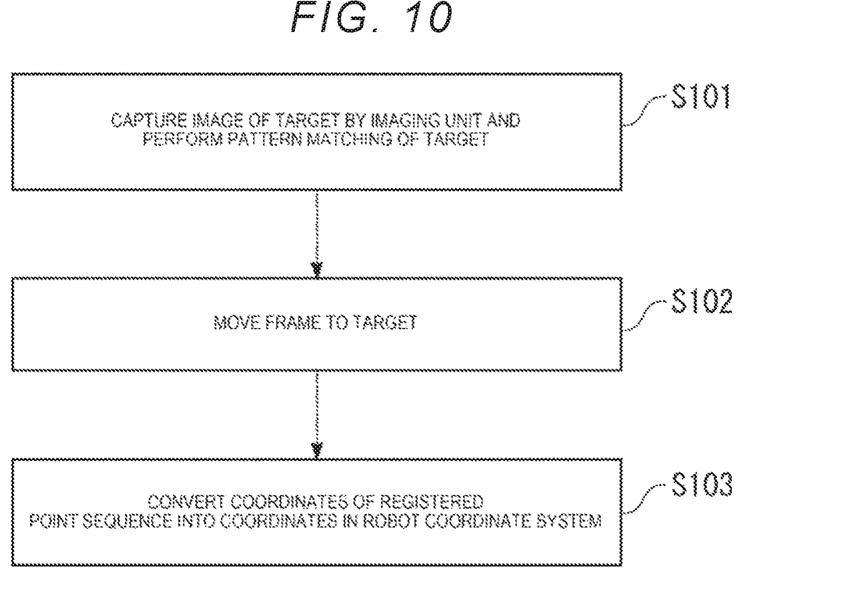
FIG. 10 is a diagram (flowchart) for explaining an operation of a robot system at the time of executing an operation program.

FIG. 1 is a diagram illustrating a robot system according to a first embodiment. FIG. 2 is a block diagram of the robot system illustrated in FIG. 1. Each of FIGS. 3 to 8 is a plan view illustrating target. FIG. 9 is a diagram (flowchart) for explaining a procedure of work performed by a worker. FIG. 10 is a diagram (flowchart) for explaining an operation of a robot system 100 at the time of executing an operation program.

In FIG. 1, xr, yr, and zr axes are illustrated as three axes orthogonal to each other, and the tip end side of the arrow indicating each axis is defined as "+ (positive)", and the base end side thereof is defined as "− (negative)". The zr-axis direction in FIG. 1 is defined as the "vertical direction", and the direction along the xr–yr plane is defined as the "horizontal direction". Further, the +zr-axis side is defined as "upper" and the −zr-axis side is defined as "lower".

Figure 3:
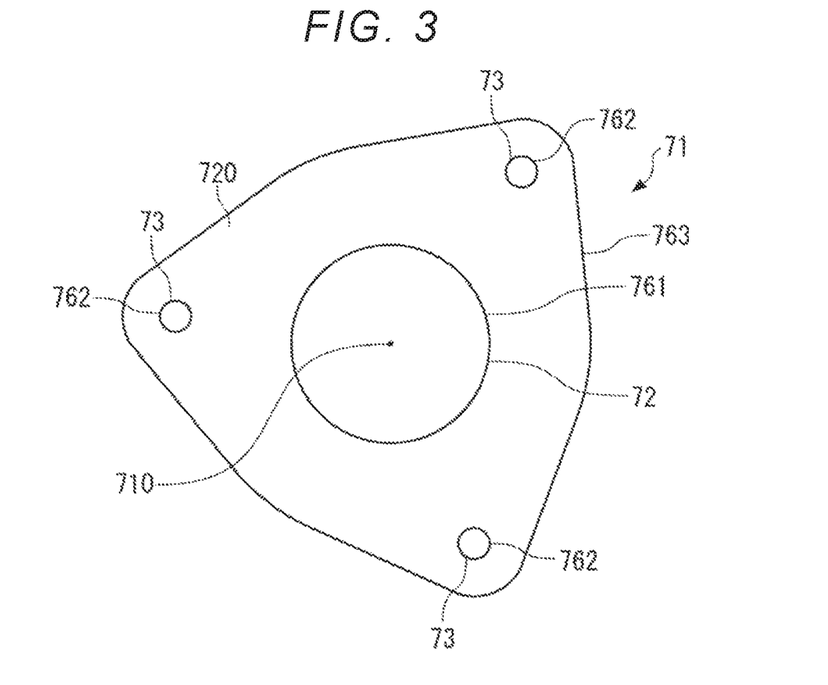
FIG. 3 is a plan view illustrating a target.

In the following description, for convenience of explanation, the upper side in FIGS. 1 and 3 is referred to as "up" or "upper" and the lower side in FIGS. 1 and 3 is referred to as "low" or "lower". The base end side in FIGS. 1 and 3 is referred to as a "base end" or "upstream", and the side opposite to the base side is referred to as "tip end" or "downstream". Also, the up-and-down direction in FIGS. 1 and 3 is the vertical direction.

Also, in this specification, the term "horizontal" includes not only a case where it is perfectly horizontal but also a case where it is inclined within ±5 degrees with respect to the horizontal. Similarly, in the present specification, the term "vertical" includes not only a case where it is perfectly vertical but also a case where it is inclined within ±5 degrees with respect to the vertical. Also, in the present specification, the term "parallel" includes not only a case where two lines (including axes) or planes are perfectly parallel to each other but also a case where two lines (including axes) or planes are inclined within ±5 degrees. Also, in the present specification, the "orthogonal" includes not only a case where two lines (including axes) or planes are perfectly orthogonal to each other but also a case where two lines (including axes) or planes inclined within ±5 degrees.

A robot system 100 illustrated in FIG. 1 includes a robot 1, an applicator 19 which is an example of an end effector (tool), an imaging device 41, an image processing device 42, a robot control device 2 for controlling an operation (driving) of the robot 1 and the like, an applicator control device 46 for controlling an operation (drive) of the applicator 19, and a computer 5 communicable with the robot control device 2 and the image processing device.

Hereinafter, each component of the robot system 100 will be sequentially described.

Robot

The robot 1 is a so-called six-axis vertical articulated robot, for example, is used in a manufacturing process for manufacturing a precision instrument and the like, and performs various work (in this embodiment, for example, coating of an adhesive to a target 71, removal of burrs, and the like) such as holding and transporting a target (not illustrated) such as a precision instrument and a component. The robot 1 includes a base 110 and a robot arm 10 (movable portion) connected to the base 110. The target is not particularly limited as long as it is used in work performed by the robot 1.

The base 110 is a portion for attaching the robot 1 to any installation place 70 such as a floor. The robot arm 10 includes an arm 11 (first arm), an arm 12 (second arm), an arm 13 (third arm), an arm 14 (fourth arm), an arm 15 (fifth arm), and an arm 16 (sixth arm). Further, the arm 15 and the arm 16 constitute wrist. The arm 16 is in a shape of a disk, and the applicator 19 can be detachably provided (attached) on the arm 16, as an example of an end effector (tool). These arms 11 to 16 are connected in this order from the base 110 side toward the applicator 19 side. In addition, each of the arms 11 to 16 is rotatable around a predetermined rotation axis (first rotation axis to sixth rotation axis) (not illustrated) with respect to the adjacent arm or base 110. That is, the base 110 and the arm 11 are connected via a joint 171. The arm 11 and the arm 12 are connected via a joint 172. The arm 12 and the arm 13 are connected via a joint 173. The arm 13 and the arm 14 are connected via a joint 174. The arm 14 and the arm 15 are connected via a joint 175. Further, the arm 15 and the arm 16 are connected via a joint 176.

The applicator 19 is constituted by, for example, a dispenser, and includes a nozzle 191 for discharging adhesive. The applicator 19 can discharge the adhesive from the nozzle 191 and coat the target 71 with the adhesive. The material to be discharged for coating by the applicator 19 is not limited to the adhesive, but may be paint or the like, for example. The center of the tip end of the nozzle 191 of the applicator 19 is referred to as a tool center point P. Further, the end effector is not limited to the applicator 19, and, for example, a deburring tool (polishing tool) for removing burrs may be included.

In the embodiment, the applicator 19 is disposed at the center of the tip end of the arm 16, but it is not limited thereto, and for example, the applicator 19 may be disposed at a position deviated from the center of the arm 16. In the embodiment, the applicator 19 is provided on the arm 16, but is not limited thereto. The applicator 19 may be provided, for example, in the fifth arm or the like, and may be provided, for example, on a part other than the robot 1, for example, a work stand, a wall, or the like. In the embodiment, the applicator 19 is not a constituent element of the robot 1, but is not limited thereto, and may be regarded as a constituent element of the robot 1.

As illustrated in FIG. 2, the robot 1 includes a drive unit 130 including a motor for rotating one arm with respect to the other arm (or base 110), a reduction gear, and the like. As the motor, for example, a servo motor such as an AC servo motor, a DC servo motor or the like can be used. As the reduction gear, for example, a planetary gear type reduction gear, a wave gear device, or the like can be used. The reduction gear may be omitted. The robot 1 includes an angle sensor 140 for measuring a rotation angle of a rotation shaft of the motor or the reduction gear. As the angle sensor 140, for example, a rotary encoder or the like can be used. The drive unit 130 and the angle sensor 140 are provided corresponding to each of the arms 11 to 16. In the embodiment, the robot 1 includes six drive units 130 and six angle sensors 140.

Although not illustrated, each of the drive units 130 is electrically connected (for example, simply referred to as "connected") to a motor driver built in the base 110 illustrated in FIG. 1, for example. Each drive unit 130 is controlled by the robot control device 2 via a corresponding motor driver. Each angle sensor 140 is electrically connected to the robot control device 2. Further, a drive unit (not illustrated) for driving the applicator 19 is controlled by the robot control device 2 via the applicator control device 46.

The configuration of the robot 1 has been briefly described as above. Such a robot 1 is controlled by the robot control device 2 which will be described later. With this, the robot 1 can perform an appropriate operation.

Although not illustrated, the robot 1 includes a force detection device (force detection unit) constituted by a six-axis force sensor or the like for detecting force (including moment) applied to the applicator 19. For example, the force detection device is disposed between the arm 16 and the applicator 19 and is electrically connected to the robot control device 2. By providing the force detection device, force control such as impedance control or the like can be performed.

Robot Control Device

The robot control device 2 controls the operation of the robot 1. In addition, the robot control device 2 controls the operation of the applicator 19 via the applicator control device 46. The robot control device 2 is constituted by a robot controller that is responsible for the functions of components of the robot 1 and is connected to the robot 1, the computer 5, the applicator control device 46, and the image processing device 42 so as to be able to communicate with each other.

The robot control device 2 and the robot 1 may be connected so as to be able to communicate with each other in a wired manner using, for example, a cable or the like, or may be connected so as to be able to communicate with each other in a wireless manner. The robot control device 2 may be separate from the robot 1, or a portion or the whole thereof may be built in the robot 1 (for example, base 110 or the like).

The robot control device 2 and the computer 5 may be connected so as to be able to communicate with each other in a wired manner using, for example, a cable or the like, or may be connected so as to be able to communicate with each other in a wireless manner.

The robot control device 2 and the applicator control device 46 may be connected so as to be able to communicate with each other in a wired manner using, for example, a cable or the like, or may be connected so as to be able to communicate with each other in a wireless manner.

The robot control device 2 and the image processing device 42 may be connected so as to be able to communicate with each other in a wired manner using, for example, a cable or the like, or may be connected so as to be able to communicate with each other in a wireless manner.

As illustrated in FIG. 2, the robot control device 2 includes a control unit 21 including a processor, a storing unit 22 including a memory and the like communicably connected to the control unit 21, and an external input and output unit (reception unit) including an external interface (I/F). The external input and output unit 23 is an example of a reception unit of the robot control device 2. Respective constituent elements of the robot control device 2 are connected so as to be able to communicate with each other via various buses.

The control unit 21 executes various programs and the like stored in the storing unit 22. With this, it is possible to realize control of the operation of the robot 1 and the applicator 19, and various processing such as computation and determination.

Various programs executable by the control unit 21 are saved (stored) in the storing unit 22. Various pieces of data received by the external input and output unit 23 can be saved in the storing unit 22. The storing unit 22 is configured to include a volatile memory such as a random access memory (RAM), a nonvolatile memory such as a read only memory (ROM), and the like. The storing unit 22 is not limited to a non-detachable type storing unit, and may be configured to include a detachable external storage device (not illustrated).

As various programs, an operation program output from the computer 5, a program for modifying or changing the operation program, and the like are included. As various pieces of data, for example, pieces of data on the position and orientation of the tool center point P, the rotation angle of each of the arm 11 to 16, and the like are included.

The external input and output unit 23 includes an external interface (I/F), and is used for connecting with each of the robot 1 and the computer 5.

Such a robot control device 2 controls, for example, the robot 1 based on (using) an operation program created by the computer 5. With this, it is possible to make the robot 1 perform an appropriate operation by using the operation program created by the computer 5.

In addition to the configuration described above, the robot control device 2 may have a configuration obtained by adding configuration to the configuration described above. Further, to the robot control device 2, a display device including a display or the like, or an input device such as a mouse, a keyboard, or the like may be connected. Various programs, data, and the like stored in the storing unit 22 may be stored in the storing unit 22 in advance, may be stored in a recording medium (not illustrated) such as a CD-ROM, may be provided from the recording medium, or may be provided via a network or the like.

Here, in the embodiment, the robot control device according to the invention is constituted with the robot control device 2 and the computer 5. In the embodiment, the control unit of the robot control device according to the invention is constituted with the control unit 21 of the robot control device 2 and the control unit 51 of the computer 5.

Computer

As the computer 5 illustrated in FIG. 2, various computers such as a personal computer (PC), for example, can be used, and the computer 5 is communicably connected to the robot control device 2 and the image processing device 42.

The computer 5 includes a control unit 51 including a processor, a storing unit 52 including a memory or the like communicably connected to the control unit 51, an external input and output unit 53 (reception unit) including an external interface (I/F). The external input and output unit 53 is an example of a reception unit of the computer 5. Respective constituent elements of the computer 5 are connected so as to be able to communicate with each other via various buses.

Further, the computer 5 and the image processing device 42 may be connected so as to be able to communicate with each other in a wired manner using, for example, a cable or the like, or may be connected so as to be able to communicate with each other in a wireless manner.

The control unit 51 executes various programs and the like stored in the storing unit 52. With this, it is possible to realize control of the image processing device 42 and the like and various processing such as computation and determination.

Various programs executable by the control unit 51 are saved in the storing unit 52. Various pieces of data received by the external input and output unit 53 can be saved in the storing unit 52. The storing unit 52 is configured to include a volatile memory such as a random access memory (RAM), a nonvolatile memory such as a read only memory (ROM), and the like. The storing unit 52 is not limited to a non-detachable type storing unit, and may be configured to include a detachable external storage device (not illustrated).

The external input and output unit 53 includes an external interface (I/F), and is used for connection with each of the robot control device 2, the image processing device 42, the display device 31, and the input device 32. Accordingly, the external input and output unit 53 has a function as a reception unit that receives an operation (instruction) of the input device 32 by a worker (user). The external input and output unit 53 has a function as an output unit that outputs signals related to various screens to a monitor of the display device 31.

In addition to the configuration described above, the computer 5 may have a configuration obtained by adding configuration to the configuration described above. Various programs, data, and the like stored in the storing unit 52 may be stored in the storing unit 52 in advance, may be stored in a recording medium (not illustrated) such as a CD-ROM, may be provided from the recording medium, or may be provided via a network or the like.

Imaging Device

The imaging device 41 includes an imaging element (not illustrated), a lens group (not illustrated), and the like. Further, the imaging device 41 is attached (fixed) to any installation place other than the robot 1 (different from the robot 1), for example, any installation place such as a wall or a ceiling. The imaging element is not particularly limited, and examples thereof include a CCD image sensor, a CMOS image sensor, and the like. The imaging device 41 performs imaging and generates image data.

Image Processing Device

The image processing device 42 performs various image processing on the image data obtained by imaging by the imaging device 41. The image processing device 42 is communicably connected to the imaging device 41.

Further, the image processing device 42 and the imaging device 41 may be connected so as to be able to communicate with each other in a wired manner by using a cable or the like, or may be connected so as to be able to communicate with each other in a wireless manner.

Applicator Control Device

The applicator control device 46 controls the operation of the applicator 19 under the control of the robot control device 2. The applicator control device 46 is constituted by an applicator controller that is responsible for functions of the respective portions included in the applicator 19, and is communicably connected to the applicator 19.

The applicator control device 46 and the applicator 19 may be connected so as to be able to communicate with each other in a wired manner using, for example, a cable or the like, or may be connected so as to be able to communicate with each other in a wireless manner.

Display Device and Input Device

The display device 31 (display) illustrated in FIG. 2 includes a display, and has a function of displaying various screens, for example. The display device 31 is not particularly limited, and examples thereof include a direct view type display device such as a liquid crystal display device and an organic EL display device, a projection type display device such as a projector, and the like. The display device 31 is connected to the computer 5, but can also be connected to the robot control device 2. Further, two display devices 31 may be prepared, and the two display devices 31 may be connected to the computer 5 and the robot control device 2. Here, a case where the display device 31 is connected to the computer 5 will be described as an example.

The input device 32 (input unit) is configured to include, for example, a mouse, a keyboard, and the like. The input device 32 is connected to the computer 5, but can also be connected to the robot control device 2. Also, two input devices 32 may be prepared, and the two input devices 32 may be connected to the computer 5 and the robot control device 2. Here, a case where the input device 32 is connected to the computer 5 will be described as an example. By operating the input device 32, a worker can instruct (input) various processing and the like to the computer 5.

Specifically, the operator can give an instruction to the computer 5 by an operation of clicking on various screens (windows and the like) displayed on the display device 31 with the mouse of the input device 32 or by an operation of inputting characters, numbers, and the like with the keyboard of the input device 32. Hereinafter, an instruction (input by the input device 32) using the input device 32 by the worker is also referred to as an "operation instruction". This operation instruction includes a selection operation for selecting desired contents from the contents displayed on the display device 31 by the input device 32 and an input instruction for inputting characters, numerals and the like by the input device 32. The input operation also includes the selection operation.

To the computer 5, one display device 31 and one input device 32 may be respectively connected, or a plurality of display devices 31 and a plurality of input devices 32 may be respectively connected. Instead of the display device 31 and the input device 32, a display input device (not illustrated) including both functions of the display device 31 and the input device 32 may be used. As the display input device, for example, a touch panel or the like can be used.

The basic configuration of the robot system 100 has been briefly described as above.

Operation and the Like of Robot System 100

Next, the procedure of work performed by the worker and the operation of the robot system 100 will be described.

As work to be performed by the robot 1, work of discharging adhesive from the nozzle 191 of the applicator 19 and coating an outer periphery 720 (peripheral edge portion) of the target 71 illustrated in FIG. 3 with the adhesive to will be described as an example.

Further, as illustrated in FIG. 3, the target 71 has an outer shape in which each corner portion of a triangle is rounded (it can be said that it is a hexagon if three minute corners are included) in a plan view of the target 71 (a state in which the surface to be coated with adhesive is the front side of the page of FIG. 3). Further, the target 71 has a through-hole 72 in the center portion thereof, and has through-holes 73 in each of three corner portions. Each of the through-holes 72 and 73 has a circular shape in a plan view of the target 71. Work to be performed by the robot 1 and the target 71 are not limited to those described above.

In the robot 1, a plurality of tool coordinate systems (robot coordinate systems) (coordinate systems) including three axes orthogonal to each other are set, and each tool coordinate system is correlated with each other. In the imaging device 41 (field of view of the imaging device 41) (image captured by the imaging device 41), an imaging device coordinate system (coordinate system) having two axes orthogonal to each other is set. Then, calibration of the imaging device 41 is ended. That is, it is assumed that a predetermined tool coordinate system which, in the embodiment, corresponds to a tool coordinate system (not illustrated) including the tool center point P as the origin and an imaging device coordinate system (not illustrated) are correlated with each other. With this, information on the position of each portion (each point) in the image (captured image) captured by the imaging device 41 can be acquired as coordinates (robot coordinates) in the tool coordinate system.

Hereinafter, in the embodiment, a case where the shape of the target 71 is the same (constant) and the position and the orientation of the target 71 are unknown in the work to be performed by the robot 1 will be described.

Operation of Robot System 100 and Procedure for Creating Operation Program

Step 1 in FIG. 9

A worker places the target 71 on the work stand 91 (see FIG. 1) and gives an operation instruction to register (teach) the shape of the target 71 with the input device 32. The field of view of the imaging device 41 is set to include the target 71 on the work stand 91.

When the external input and output unit 53 of the computer 5 receives the operation instruction, the imaging device 41 captures an image of the target 71 and obtains an image (image data) according to an instruction from the control unit 51. The obtained image is displayed on the display device 31, and the worker can give each operation instruction while watching the image. Hereinafter, image data is also referred to as "image".

The control unit 51 registers the shape of the target 71 based on the obtained image of the target 71. As a specific example, for example, the contour of a predetermined part of the target 71 is registered in a Geometric object. This registration is performed by storing the contour in the storing unit 52. Hereinafter, the description "to store in the storing unit 52" will be omitted.

Figure 4:
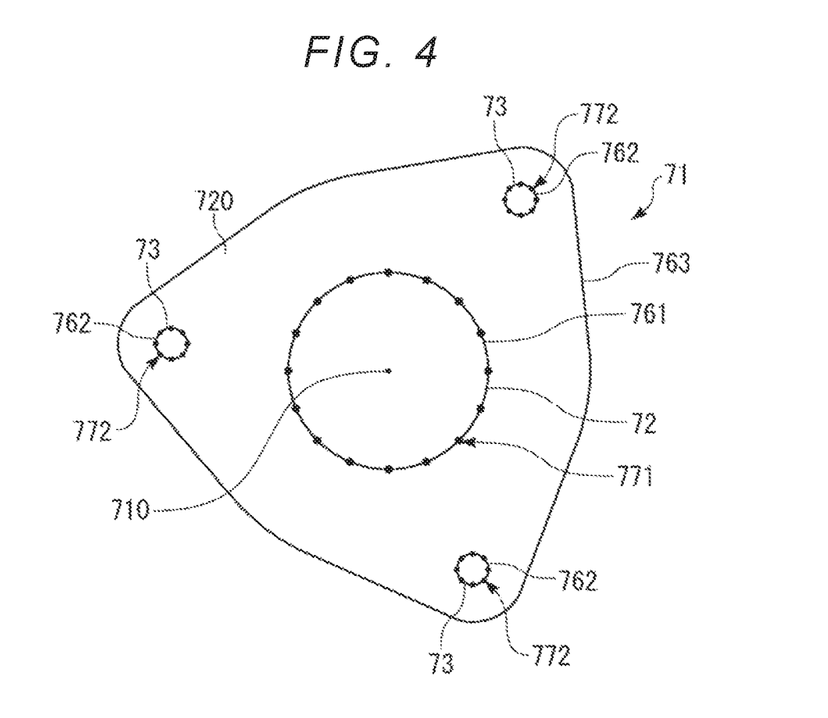
FIG. 4 is another plan view illustrating the target.

Specifically, a predetermined mask is applied (provided) to the image of the target 71, and the contour of the part of the target 71 not masked with the image of the target 71 is registered as a point cloud. That is, the coordinates of each point of the point cloud in the imaging device coordinate system are registered. In the embodiment, as illustrated in FIG. 4, a contour 761 of a through-hole 72 part of the target 71 is registered as a point cloud 771, and contours 762 of three through-hole 73 parts are registered as point clouds 772, respectively. The contour (shape) to be registered is not limited thereto as long as it is possible to specify the target 71, and it may be, for example, a contour 763 of the outer periphery 720 of the target 71. The contour to be registered in Step 1 and the contour to be registered in Step 3 to be described later may be the same portion or different portions. The mask can be provided in any manner by the operator while watching the image displayed on the display device 31. Further, the mask may not be provided.

Step 2 in FIG. 9

The worker gives an operation instruction to connect the contours 761 and 762 of the target 71 registered in Step 1 and a frame (not illustrated) in which the imaging device coordinate system is set, with the input device 32.

When the external input and output unit 53 receives the operation instruction, the control unit 51 connects the contours 761 and 762 of the target 71 registered in Step 1 and a frame (not illustrated) in which the imaging device coordinate system is set. This connection between the contours 761 and 762 and the target 71 is made by storing the contours 761 and 762 of the target 71 in the storing unit 52. When this connection is made, in Step 3 to be described later, the frame is moved to the positions of the contours 761 and 762 registered in Step 1 in the image. The frame is moved such that the attitude of the imaging device coordinate system which is set in the frame is always constant with respect to the contours 761 and 762 registered in Step 1.

Step 3 in FIG. 9

The worker gives an instruction to select the contour (shape) of the portion to be coated with adhesive from among the plurality of contours 761, 762, and 763 of the target 71, with the input device 32. In the embodiment, the contour 763 of the outer periphery 720 of the target 71 is selected. The image to be used in Step 3 may be the image used in Step 1 or an image obtained by imaging the target 71 newly by the imaging device 41.

When the external input and output unit 53 receives the operation instruction, the control unit 51 moves the frame to the positions of the contours 761 and 762 registered in Step 1 in the image so that the attitude of the imaging device coordinate system which is set in the frame is always constant with respect to the contours 761 and 762. Then, the contour 763 of the outer periphery 720 of the target 71 is extracted, a point sequence 783 corresponding to the contour 763 is generated (see FIG. 6) and registered.

In the embodiment, since work to be performed by the robot 1 is an operation of coating the outer periphery 720 of the target 71 with adhesive, the point sequence 783 to be registered is set so as to be disposed on the centroid 710 side rather than the contour 763.

Figure 5:
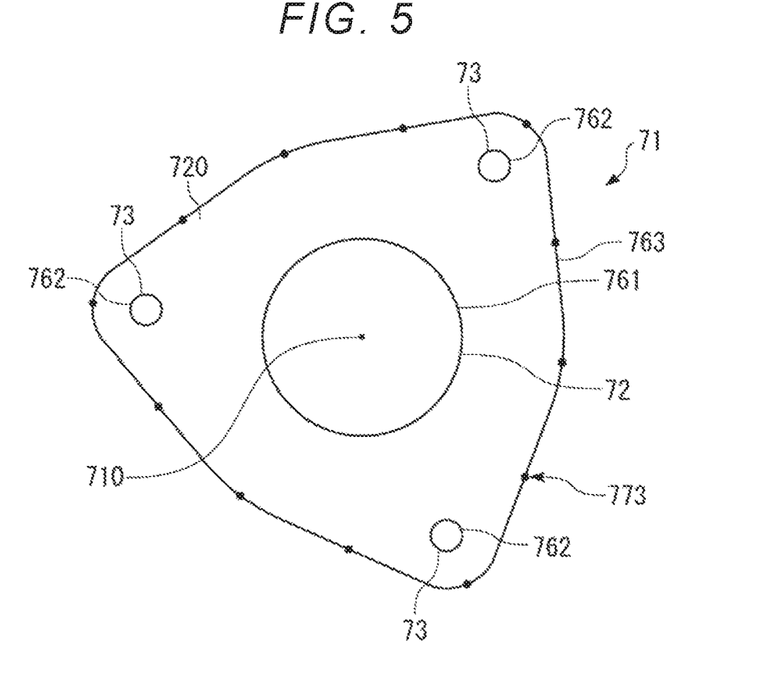
FIG. 5 is another plan view illustrating the target.
Figure 6:
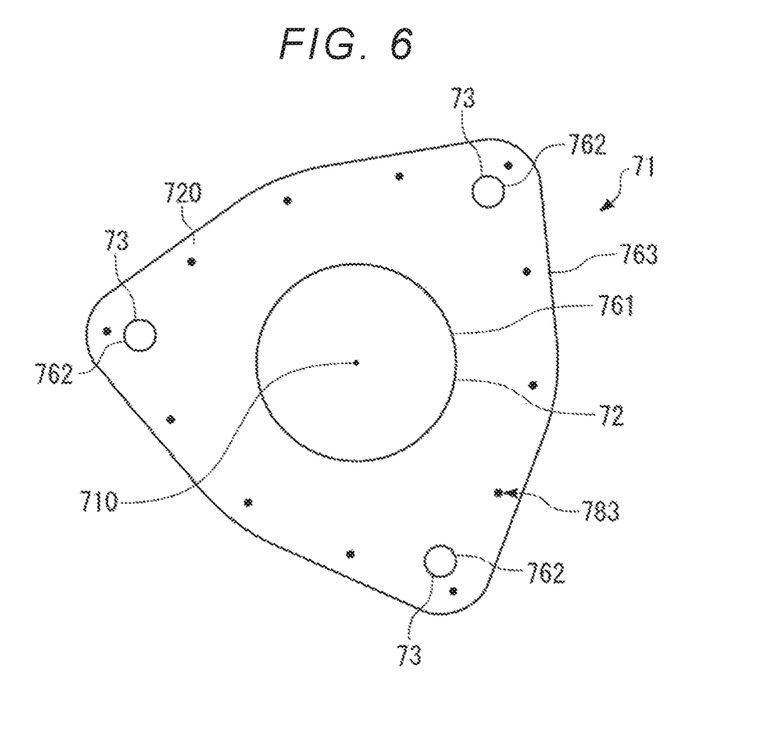
FIG. 6 is another plan view illustrating the target.

Specifically, when generating the point sequence 783 corresponding to the contour 763, the control unit 51 extracts the entire contour 763 as illustrated in FIG. 5, obtains a point sequence 773 on the contour 763 for the entire contour 763 (disposes the point sequence 773 on the contour 763), disposes the point sequence 773 so as to be positioned on the centroid 710 side (inner side) rather than the contour 763 again as illustrated in FIG. 6, and generates the point sequence 783. Then, the rearranged point sequence 783 is registered. That is, the coordinates of each point in the point sequence 783 in the imaging device coordinate system are registered.

A point sequence to be registered may be arranged (rearranged) on the centroid 710 side (inner side) of the contour 763 rather than the contour 763 as in the embodiment, may be arranged on the opposite side (outer side) to the centroid 710 of the contour 763 rather than the contour 763, or may be arranged on the contour 763. Also, it is possible to select predetermined rearrangement of the point sequence from among three rearrangements described above.

In the case where the point sequence is arranged on the centroid 710 side of the contour 763 rather than the contour 763 or in the case where the point sequence is arranged on the opposite side to the centroid 710 side of the contour 763 rather than the contour 763, the shape formed by the point sequence is similar to the shape of the contour 763. That is, the points of the point sequence are separated by the same distance from the contour 763, respectively. In addition, in a case where the point sequence is arranged on the contour 763, the shape formed by the point sequence coincides with the contour 763 including the size.

In a case where work to be performed by the robot 1 is work of removing the burr formed on the outer periphery 720 of the target 71 (work of polishing the outer periphery 720), the point sequence to be registered is set so as to be disposed on the opposite side to the centroid 710 rather than the contour 763.

When Steps 1 to 3 are ended, the worker creates an operation program of the robot 1 using information obtained in Step 3. In this case, the coordinates of each point in the point sequence 783 in the imaging device coordinate system are a teaching point of the robot 1. The operation program is stored in the storing unit 22 of the robot control device 2. Then, the control unit 21 reads out and executes the operation program when necessary.

Here, although, in the embodiment, when generating the point sequence 783 corresponding to the contour 763, the control unit 51 extracts the entire contour 763, obtains the point sequence 773 on the contour 763 for the entire contour 763, and rearranges the point sequence 773 so as to be positioned on the centroid 710 side rather than the contour 763, the invention is not limited thereto.

Figure 7:
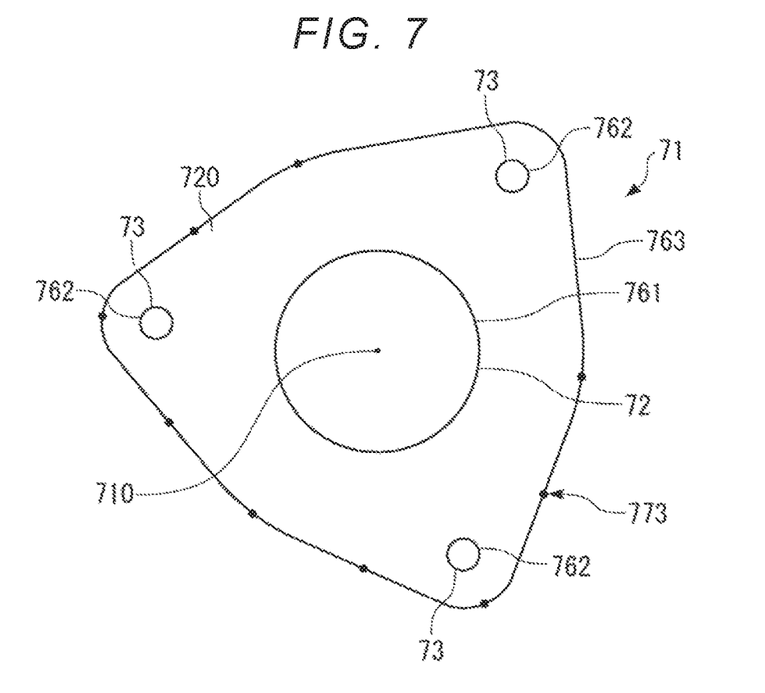
FIG. 7 is another plan view illustrating the target.
Figure 8:
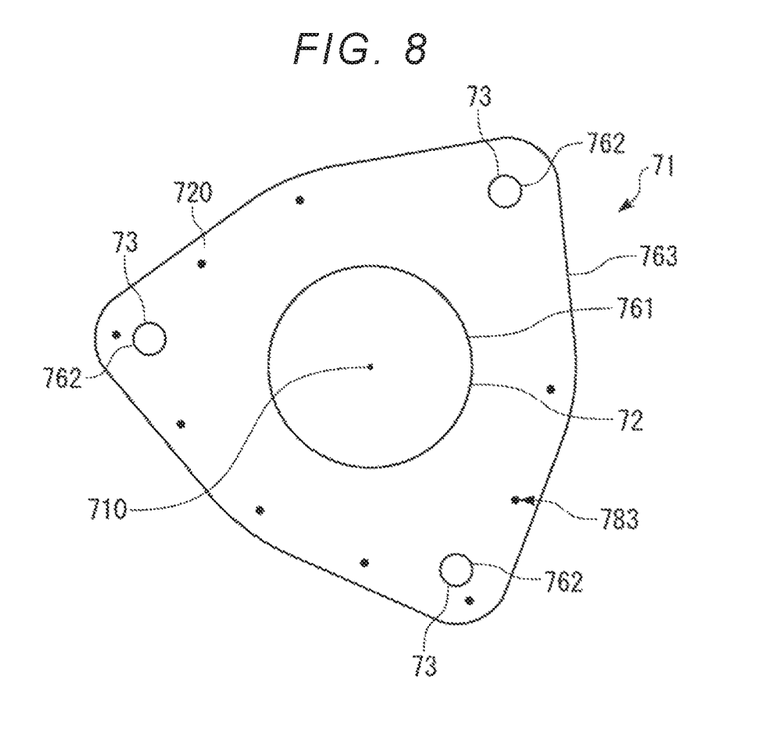
FIG. 8 is another plan view illustrating the target.

In another form, when generating the point sequence 783 corresponding to the contour 763, the control unit 51 extracts a portion of the contour 763 as illustrated in FIG. 7, obtains the point sequence 773 on the contour 763 (arranges the point sequence 773 on the contour 763) for the portion of the contour 763, rearranges the point sequence 773 so as to be positioned on the centroid 710 side rather than the contour 763 as illustrated in FIG. 8, and generates the point sequence 783.

When extracting the entire contour 763 and extracting a portion of the contour 763, a line segment (not illustrated) at a position shifted from the contour 763 may be added to such extractions. Further, when obtaining the point sequence 773 on the contour 763 for the entire contour 763 and when determining the point sequence 773 on the contour 763 for a portion of the contour 763, the point sequence at the position deviated from the contour 763 (not illustrated) may be added to such obtainment and determination.

Operation of Robot System 100 at Execution of Operation Program Step S101 of FIG. 10

When the robot 1 performs an operation of coating the outer periphery 720 of the target 71 with adhesive, the imaging device 41 images the target 71 and obtains an image (image data) under the instruction of the control unit 21 of the robot control device 2. Then, the control unit 21 performs pattern matching of the target 71 with the registered contours 761 and 762 (see FIG. 4) as a reference, with respect to the obtained image of the target 71, and detects contours 761 and 762 of the target 71 in the image.

Step S102 of FIG. 10

The control unit 21 moves the frame in which the imaging device coordinate system is set to the positions of the contours 761 and 762 in the image such that the orientation of the imaging device coordinate system which is set in the frame is always constant with respect to the contour 761 and 762.

Step S103 of FIG. 10

The coordinates in the imaging device coordinate system which is set in the frame of each point of the registered point sequence 783 (see FIG. 6) are converted into coordinates in the tool coordinate system which is set in the robot 1 and registered. With this, the worker can easily create the operation program without considering a relationship between the coordinates in the imaging device coordinate system of each point of the point sequence 783 and the coordinates in the tool coordinate system which is set in the robot 1, and reduce the labor and shorten the time.

Then, under the control of the control unit 21, the robot 1 drives the robot arm 10 to move the nozzle 191 of the applicator 19 along the point sequence 783 of the target 71, discharges the adhesive from the nozzle 191, and coating is performed along the point sequence 783 of the target 71 with the adhesive. With this, a part which corresponds to the outer periphery 720 of the target 71 and is the inner part than the contour 763 can be coated with adhesive.

As described above, according to the robot system 100, the robot 1 can easily create the operation program of the robot 1 for performing the operation of coating the outer periphery 720 of the contour 763 of the target 71 with the adhesive.

As described above, the robot control device 2 is a robot control device that controls the robot 1. The robot control device 2 (computer 5) includes the control unit 21 (control unit 51) for extracting the contour 763 of the target 71 based on the image of the target 71 captured by the imaging device 41, generating the point sequence 783 corresponding to the contours 763 and 783 into coordinates in the coordinate system which is set in the robot 1, and converting the coordinates of the point sequence 783 into coordinates in the coordinate system set in the robot 1.

According to such a robot control device 2 (computer 5), since the coordinates of the point sequence 783 corresponding to the contour 763 of the target 71 are converted into the coordinates in the coordinate system which is set in the robot 1, the robot 1 can easily create an operation program of the robot 1 for performing work on the contour 763 part of the target 71.

The point sequence 783 is disposed on the centroid side of the contour 763 rather than the contour 763. With this, it is possible to perform work on a part on the centroid side of the contour 763 rather than the contour 763 of the target 71.

The point sequence corresponding to the contour 763 of the target 71 is disposed on the opposite side to the centroid of the contour 763 rather than the contour 763. With this, it is possible to perform work on a part of the opposite side of the contour 763 to the centroid rather than the contour 763 of the target 71.

When extracting the contour 763, the control unit 51 extracts the contour 763 as a point cloud. With this, it is possible to easily generate the point sequence 783 corresponding to the contour 763 of the target 71.

When extracting the contour 763, the control unit 51 extracts a portion of the contour 763. With this, it is possible to perform work on a portion of the contour 763 part of the target 71.

The robot 1 includes the robot arm 10 and is controlled by the robot control device 2.

According to such a robot 1, it is possible to perform an appropriate operation under the control of the robot control device 2.

The robot system 100 includes the robot 1, a robot control device 2 that controls the robot 1, and the computer 5.

According to such a robot system 100, since the coordinates of the point sequence 783 corresponding to the contour 763 of the target 71 are converted into coordinates in the coordinate system which is set in the robot 1, it is possible to easily create an operation program of the robot 1 for the robot 1 to perform work on the contour 763 part of the target 71.

The robot control device 2 is a robot control device that controls the robot 1. The robot control device 2 includes a processor, and the computer 5 includes a processor. The processor extracts the contour 763 of the target 71 based on the image of the target 71 captured by the imaging device 41, generates the point sequence 783 corresponding to the contour 763, and converts the coordinates of the point sequence 783 to the coordinates in the coordinate system which is set in the robot 1.

According to such a robot control device 2 (computer 5), since the coordinates of the point sequence 783 corresponding to the contour 763 of the target 71 are converted into the coordinates in the coordinate system which is set in the robot 1, it is possible to easily create the operation program of the robot 1 for the robot 1 to perform work on the contour 763 part of the target 71.

Second Embodiment

Hereinafter, a second embodiment will be described, but differences from the embodiment described above will be mainly described, and description of similar matters will be omitted.

In the robot system 100 according to the second embodiment, description will be made on a case where the position and orientation of the target 71 are the same (constant) and there is an individual difference in the shape of the target 71.

Operation of Robot System 100 and Procedure for Creating Operation Program

The worker gives an operation instruction to register a rule (in the following, also referred to as "selection rule") which is an example of an instruction to extract (select) the contour of the target 71 from the image obtained by imaging the target 71 by the imaging device 41 with the input device 32. As a specific example of the rule, for example, "extract the contour where the area of the part surrounded by the contour is the largest", "extract the contour where the area of the part surrounded by the contour is the second largest", and the like may be included. In the embodiment, for example, a selection rule of "extract the contour where the area of the part surrounded by the contour is the largest" is registered.

When the external input and output unit 23 of the robot control device 2 receives the operation instruction, the control unit 21 registers the selection rule. This registration is performed by storing the selection rule in the storing unit 22. Hereinafter, the description "to store in the storing unit 22" will be omitted. By doing as described above, the selection rule (instruction) is predetermined. Next, the worker creates an operation program of the robot 1.

Operation of Robot System 100 at Execution of Operation Program

When the robot 1 performs an operation of coating the outer periphery 720 of the target 71 with adhesive, the imaging device 41 images the target 71 and obtains an image (image data) under the instruction of the control unit 21 of the robot control device 2. Then, the control unit 21 extracts the contour 763 (see FIG. 5) of the target 71 in the image based on the obtained image of the target 71 and the registered selection rule.

The control unit 21 moves the frame in which the imaging device coordinate system is set to the position of the contour 763 of the target 71 in the image such that the orientation of the imaging device coordinate system which is set in the frame is always constant with respect to the contour 763. Then, the point sequence 783 corresponding to the contour 763 is generated (see FIG. 6) and registered.

In the embodiment, since work to be performed by the robot 1 is an operation of coating the outer periphery 720 of the target 71 with adhesive, the point sequence 783 to be registered is set so as to be disposed on the centroid 710 side rather than the contour 763.

Specifically, when generating the point sequence 783 corresponding to the contour 763, the control unit 21 extracts the entire contour 763 as illustrated in FIG. 5, obtains the point sequence 773 on the contour 763 for the entire contour 763 (disposes the point sequence 773 on the contour 763), rearranges the point sequence 773 so as to be positioned on the centroid 710 side (inner side) rather than the contour 763 again as illustrated in FIG. 6, and generates the point sequence 783. Then, the rearranged point sequence 783 is registered. That is, the coordinates of each point in the point sequence 783 in the imaging device coordinate system are registered.

The control unit 21 converts coordinates in the imaging device coordinate system which is set in the frame of each point of the registered point sequence 783 into coordinates in the tool coordinate system which is set in the robot 1, and registers the coordinates. With this, the worker can easily create the operation program without considering a relationship between the coordinates in the imaging device coordinate system of each point of the point sequence 783 and the coordinates in the tool coordinate system which is set in the robot 1, and reduce the labor and shorten the time.

Then, under the control of the control unit 21, the robot 1 drives the robot arm 10 to move the nozzle 191 of the applicator 19 along the point sequence 783 of the target 71, discharges the adhesive from the nozzle 191, and coating is performed along the point sequence 783 of the target 71 with adhesive. With this, a part which corresponds to the outer periphery 720 of the target 71 and is the inner part than the contour 763 can be coated with adhesive.

Even with the second embodiment as described above, the same effect as that of the embodiment described above can be exhibited.

In the work to be performed by the robot 1, in a case where the position and orientation of the target 71 are unknown, and there is an individual difference in the shape of the target 71, Step 3 in FIG. 9 in the first embodiment may be replaced with the operation of the robot system 100 and the procedure at the time of creation of the operation program in the second embodiment or Step S103 of FIG. 10 in the first embodiment may be replaced with the operation of the robot system 100 at the time of execution of the operation program in the second embodiment.

As described above, the robot control device 2 is a robot control device that controls the robot 1. The robot control device 2 (computer 5) includes the control unit 21 (control unit 51) that extracts the contour 763 of the target 71 based on an image of the target 71 captured by the imaging device 41 and predetermined instructions, generates the point sequence 783 corresponding to the contour 763, and converts coordinates of the point sequence 783 into coordinates in a coordinate system which is set in the robot 1.

According to such a robot control device 2 (computer 5), since the coordinates of the point sequence 783 corresponding to the contour 763 of the target 71 are converted into the coordinates in the coordinate system set in the robot 1, it is possible to easily create the operation program of the robot 1 for the robot 1 to perform work on the contour 763 part of the target 71.

Further, the robot control device 2 is a robot control device that controls the robot 1. The robot control device 2 includes a processor, and the computer 5 includes a processor. The processor extracts the contour 763 of the target 71 based on the image of the target 71 captured by the imaging device 41 and a predetermined instruction, generates the point sequence 783 corresponding to the contour 763, and converts the coordinates of the point sequence 783 into coordinates in the coordinate system which is set in the robot 1.

According to such a robot control device 2 (computer 5), since the coordinates of the point sequence 783 corresponding to the contour 763 of the target 71 are converted into the coordinates in the coordinate system set in the robot 1, it is possible to easily create an operation program of the robot 1 for the robot 1 to perform work on the contour 763 part of the target 71.

MODIFICATION EXAMPLE

Figure 11:
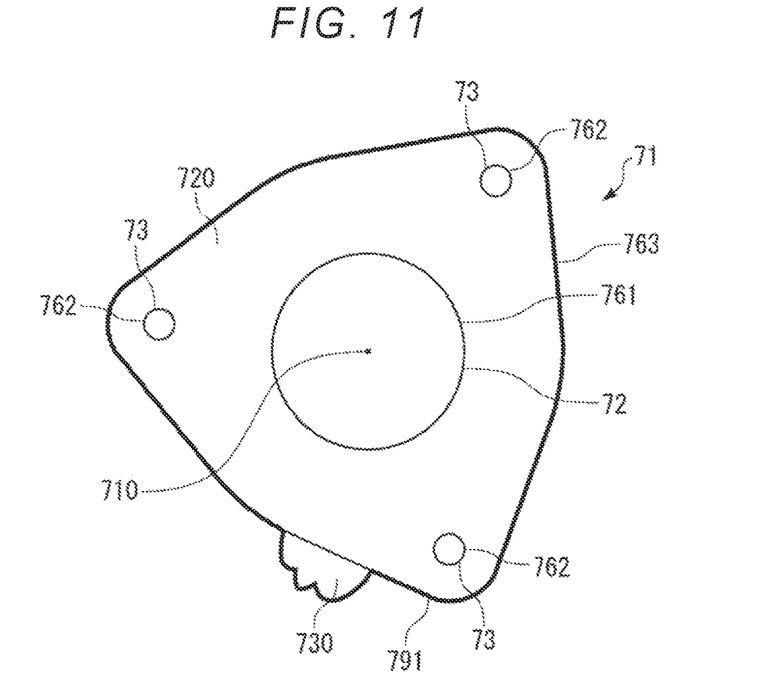
FIG. 11 is a view illustrating a target for explaining a modification example.
Figure 12:
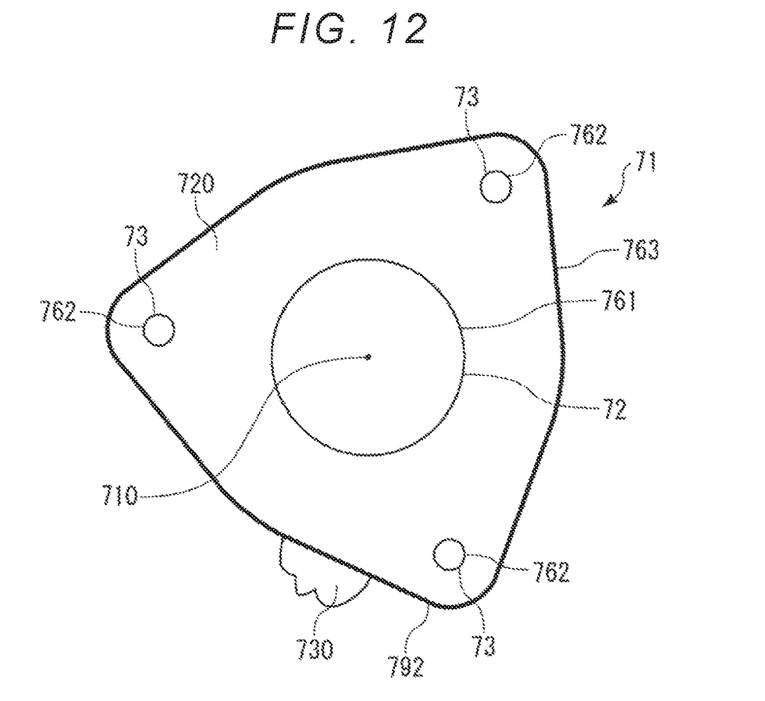
FIG. 12 is another view illustrating the target for explaining the modification example.

FIGS. 11 and 12 are diagrams of targets for explaining modification examples, respectively. In FIG. 11, a contour locus 791 is described with a thicker line than the other parts, and in FIG. 12, a contour locus 792 is described with a thicker line than the other parts.

Hereinafter, modification examples will be described, but differences from the embodiments described above will be mainly described, and description of similar items will be omitted.

As illustrated in FIGS. 11 and 12, in a case where a burr 730 is present on the outer periphery 720 of the target 71, the contour locus 791 including the burr 730 of the outer periphery 720 of the target 71 illustrated in FIG. 11 and the contour locus 792 which does not include the burr 730 of the outer periphery 720 of the target 71 illustrated in FIG. 12 are set. With this, it is possible to obtain the contour locus of only the burr 730 by subtracting the contour locus 792 from the contour locus 791.

Figure 13:
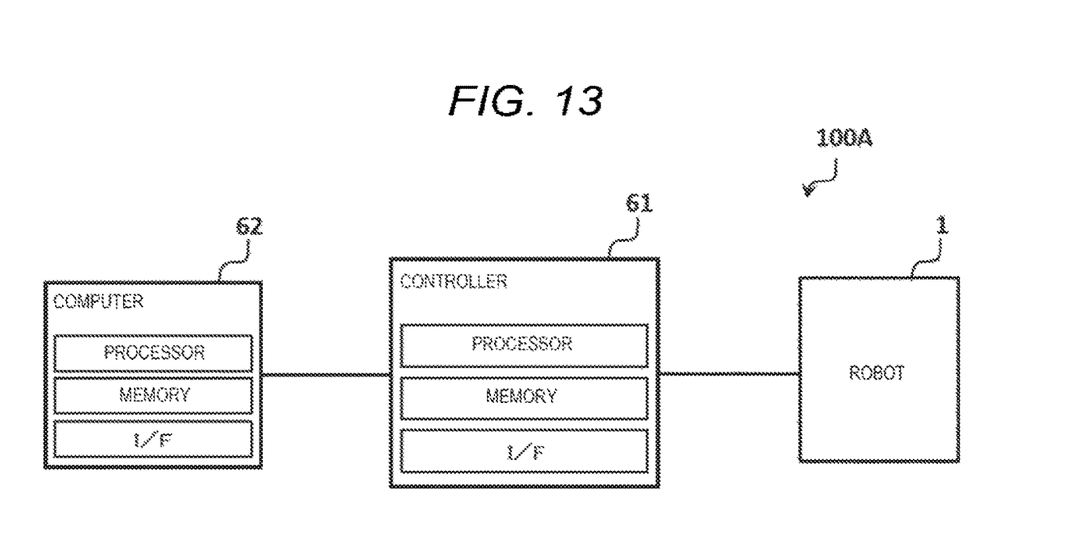
FIG. 13 is a block diagram for mainly explaining hardware (processor) regarding the first embodiment and a second embodiment.

FIG. 13 is a block diagram for mainly explaining hardware (processor) regarding the first embodiment and the second embodiment.

In FIG. 13, the entire configuration of a robot system 100A to which the robot 1, the controller 61, and the computer 62 are connected is illustrated. Control of the robot 1 may be executed by reading an instruction in a memory by a processor in the controller 61 or may be executed by reading an instruction in the memory by the processor existing in the computer 62 and executing an instruction via the controller 61.

Modification Example 1

Figure 14:
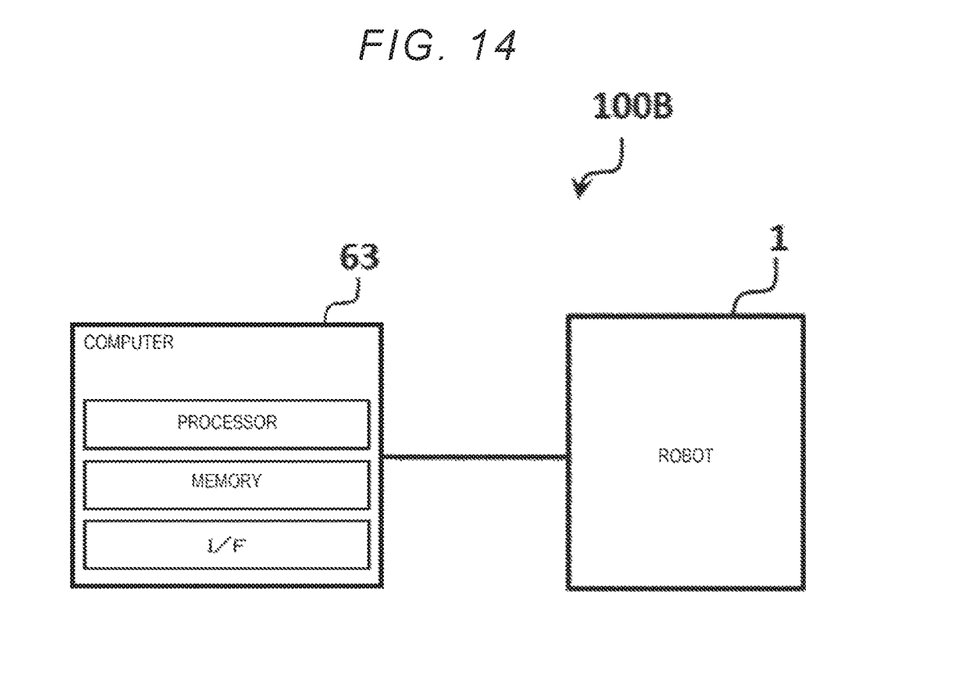
FIG. 14 is a block diagram illustrating another example 1 (modification example 1) of the robot system according to the invention.

FIG. 14 is a block diagram illustrating another example 1 (modification example 1) of the robot system according to the invention.

In FIG. 14, the entire configuration of a robot system 100B in which a computer 63 is directly connected to the robot 1 is illustrated. Control of the robot 1 is executed directly by reading an instruction in the memory by a processor existing in the computer 63.

Modification Example 2

Figure 15:
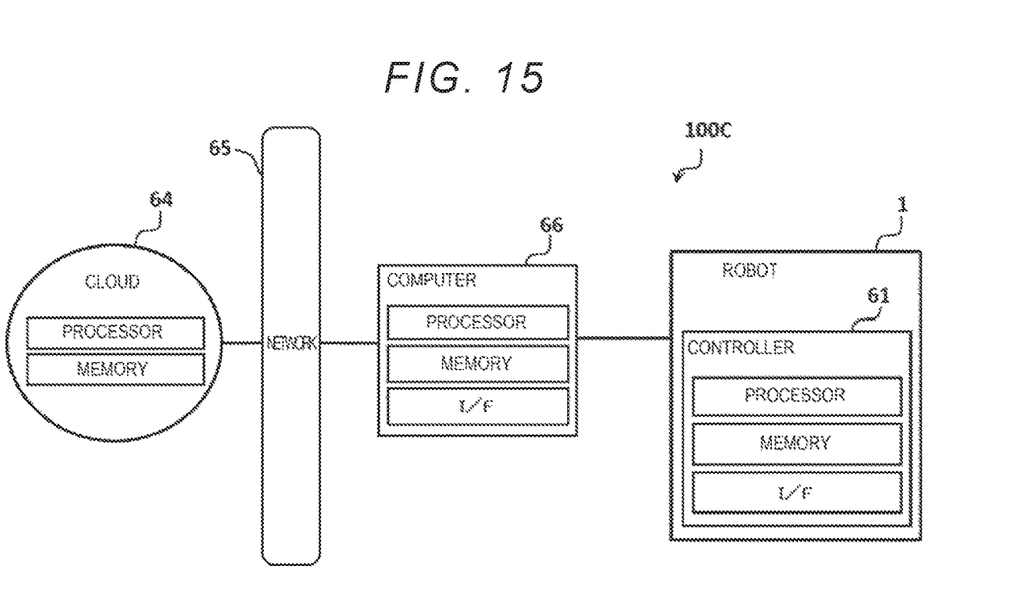
FIG. 15 is a block diagram illustrating another example 2 (modification example 2) of the robot system according to the invention.

FIG. 15 is a block diagram illustrating another example 2 (modification example 2) of the robot system according to the invention.

In FIG. 15, the entire configuration of a robot system 100C in which the robot 1 with a controller 61 built therein and a computer 66 are connected, and the computer 66 is connected to a cloud 64 via a network 65 such as the LAN is illustrated. Control of the robot 1 may be executed by reading an instruction in the memory by a processor existing in the computer 66 or may be executed by reading an instruction in the memory via the computer 66 by a processor existing on the cloud 64.

In each of the robot systems 100A, 100B, and 100C, each of the processors may be constituted by a single device or a plurality of devices, that is, each processor may be divided into a plurality of unit processors.

Although the robot control device, the robot, and the robot system according to the invention have been described as above based on the illustrated embodiments, the invention is not limited thereto, and the configuration of each component can be replaced with any configuration having the same function. Further, any other constituent elements may be added thereto.

Further, the invention may be a combination of any two or more configurations (features) among the embodiments described above.

In the embodiments described above, the six-axis vertical articulated robot is exemplified as the robot, but the invention is not limited thereto. For example, a robot of other forms such as a horizontal articulated robot such as a SCARA robot, a leg type walking (running) robot with legs, and the like may be adopted. Further, the robot is not limited to a single-arm robot, but may be another robot such as a dual-arm robot, for example. Accordingly, the number of the robot arms (movable portions) is not limited to one, and may be two or more. Further, the number of arms included in the robot arm (movable portion) is six in the embodiments described above, but may be one to five, or seven or more.

The entire disclosure of Japanese Patent Application No. 2017-213524, filed Nov. 6, 2017 is expressly incorporated by reference herein.

What is claimed is:

1. A robot control device comprising:
a memory configured to store a program; and
a processor configured to execute the program so as to:
- cause an imaging device to capture a first image of a target object placed on a work stand so as to obtain first image data of the target object;
- store the first image data into the memory;
- extract a contour of the target object based on the first image data;
- obtain a point cloud of the contour of the target object;
- store the point cloud of the contour of the target object into the memory;
- store a point sequence of the point cloud into the memory;
- determine a correlation between the contour and an imaging device coordinate system of the imaging device;
- store the correlation into the memory;
- cause a robot to operate after the first image data, the point cloud, the point sequence, and the correlation are stored into the memory;
- cause the imaging device to capture a second image of the target placed on the work stand so as to obtain second image data of the target object during the operation of the robot;
- perform pattern matching by comparing between the second image data and the stored contour of the target object to obtain a matched contour of the target object in the second image;
- convert the imaging device coordinate system relating to the point sequence of the matched contour into a robot coordinate system of the robot; and
- cause the robot to operate with respect to the target object based on the point sequence of the matched contour under the robot coordinate system.

2. The robot control device according to claim 1, wherein the processor is configured to dispose the point sequence shifting toward a centroid of the target object from the contour of the target object.

3. The robot control device according to claim 1, wherein the processor is configured to dispose the point sequence shifting away from a centroid of the target object from the contour of the target object.

4. The robot control device according to claim 1, wherein the processor is configured to extract a portion of the contour of the target object when the processor extracts the contour of the target object based on the first image data.

5. A robot system comprising:
a robot;
an imaging device; and
a robot control device that controls the robot, the robot control device including:
a memory configured to store a program; and
a processor configured to execute the program so as to:
- cause an imaging device to capture a first image of a target object placed on a work stand so as to obtain first image data of the target object;
- store the first image data into the memory;
- extract a contour of the target object based on the first image data;
- obtain a point cloud of the contour of the target object;
- store the point cloud of the contour of the target object into the memory;
- store a point sequence of the point cloud into the memory;
- determine a correlation between the contour and an imaging device coordinate system of the imaging device;
- store the correlation into the memory;
- cause a robot to operate after the first image data, the point cloud, the point sequence, and the correlation are stored into the memory;
- cause the imaging device to capture a second image of the target placed on the work stand so as to obtain second image data of the target object during the operation of the robot;
- perform pattern matching by comparing between the second image data and the stored contour of the target object to obtain a matched contour of the target object in the second image;
- convert the imaging device coordinate system relating to the point sequence of the matched contour into a robot coordinate system of the robot; and
- cause the robot to operate with respect to the target object based on the point sequence of the matched contour under the robot coordinate system.

* * * * *